United States Patent [19]
Phillips

[11] Patent Number: 5,583,589
[45] Date of Patent: Dec. 10, 1996

[54] PROCESS FOR FORMING A MONOCENTRIC SEAMLESS BIFOCAL LENS

[75] Inventor: Edward H. Phillips, Warren, N.J.

[73] Assignee: Phillips Lens Co., Inc., Middlesex, N.J.

[21] Appl. No.: 499,329

[22] Filed: Jul. 7, 1995

[51] Int. Cl.$^6$ ........................................ G02C 7/02
[52] U.S. Cl. ........................................ 351/177; 351/168
[58] Field of Search ........................... 351/177, 168, 351/161; 451/42

[56] References Cited

U.S. PATENT DOCUMENTS

| | | | |
|---|---|---|---|
| 2,890,551 | 6/1959 | Dalton | 451/42 |
| 2,994,166 | 8/1961 | Bardwell et al. | 451/42 |
| 3,348,340 | 10/1967 | Calkins et al. | 451/42 |
| 4,018,587 | 4/1977 | Maitenaz | 351/177 |
| 4,693,572 | 9/1987 | Tsuetaki et al. | 351/161 |
| 5,214,453 | 5/1993 | Giovanzana | 351/161 |

Primary Examiner—Ali Neyzari
Assistant Examiner—Jordan M. Schwartz
Attorney, Agent, or Firm—Shoemaker and Mattare, Ltd.

[57] ABSTRACT

A monocentric seamless bifocal lens is manufactured by obtaining a lens blank having concentric top and bottom spherical surfaces, and grinding the bottom surface to form a major segment having one spherical radius and a minor segment having a second spherical radius. The lens is then placed on a block having two spherical surface portions whose shape conforms to the shape of the major segment, but differs from the shape of the minor segment. The block also has a slight dihedral angle, so that a space remains between the block and at least part of the minor segment. As it rests on the block, the lens is heated so that it sags under its own weight until its bottom surface assumes the shape of the block, and the radius of curvature of the upper surface becomes non-uniform. Finally the bottom surface of the lens is ground and polished to a uniform spherical radius.

2 Claims, 2 Drawing Sheets

PROCESS FOR FORMING A MONOCENTRIC SEAMLESS BIFOCAL LENS

BACKGROUND OF THE INVENTION

This invention relates to optical devices, and more particularly to a process for forming monocentric seamless bifocal lenses from a high refractive index material.

Bifocal lenses present the well-known problem of image shift at the interface between segments of the lens having different focal points. Another detracting aspect of bifocal lenses is that they may be taken as an unflattering indication of the age of the wearer. Lenses having a smooth transition between the optical segments are thus commercially important.

Prior inventors have addressed the above problems in a number of ways; however, a simpler way of manufacturing bifocal lenses to address both criteria would be desirable.

SUMMARY OF THE INVENTION

An object of the invention is to produce a bifocal lens having a smooth image transition between the near and far vision segments of the lens.

Another object of the invention is to simplify the manufacture of bifocal lenses.

A further object of the invention is to provide a transition between optical segments which is less discernable by others.

These and other objects are attained by making a monocentric seamless bifocal lens by: (a) obtaining a lens blank having concentric top (anterior) and bottom (posterior) spherical surfaces, (b) grinding the bottom surface to form a major segment having one spherical radius and a minor segment having a smaller spherical radius, (c) placing the lens on a block having an upper spherical surface with a radius substantially equal to that of the major segment so that the major segment is supported by the block, but a space remains between the block and at least part of the minor segment, (d) heating the lens while it rests on the block so that the lens sags under its own weight to assume the shape of the block, whereupon the radius of the upper surface becomes non-uniform, and then (e) grinding and polishing the bottom surface of the lens to a uniform spherical radius.

DESCRIPTION OF THE PREFERRED EMBODIMENT

Figure 1:
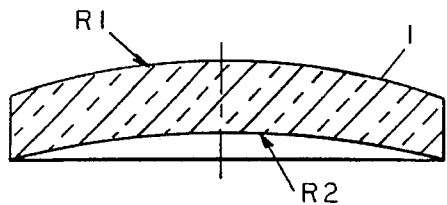
FIG. 1 is a side sectional view of a lens blank having concentric top and bottom surfaces.
Figure 2:
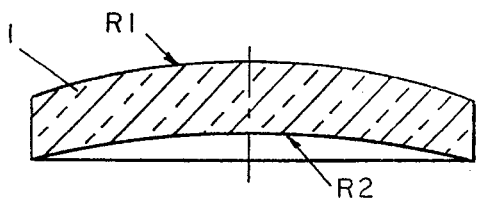
FIG. 2 is a top sectional view thereof, taken on a plane transverse to that of FIG. 1.

The manufacture of a monocentric seamless bifocal lens embodying the invention is shown in FIGS. 1–9. The process begins with a lens blank, shown in FIGS. 1 and 2. The convex top anterior surface of the blank is already polished, and has a uniform spherical radius R1. The bottom posterior surface of the blank is an unpolished ground surface with a spherical radius R2, and is about concentric with the top surface. The orthogonal sectional views of FIGS. 1 and 2 are at this point identical.

Figure 3:
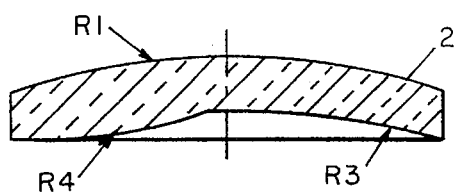
FIG. 3 is a side sectional view of a lens whose bottom surface has been ground at two different radii.
Figure 4:
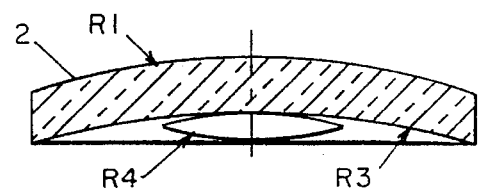
FIG. 4 is a top sectional view thereof, taken in the leftward direction in FIG. 3.
Figure 5:
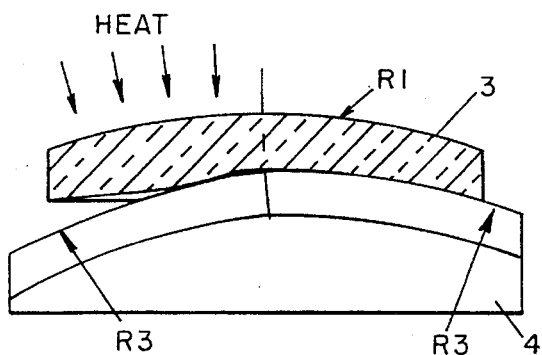
FIG. 5 is a side sectional view (like FIG. 3), of the ground lens resting on a partially conforming block, while being heated.
Figure 6:
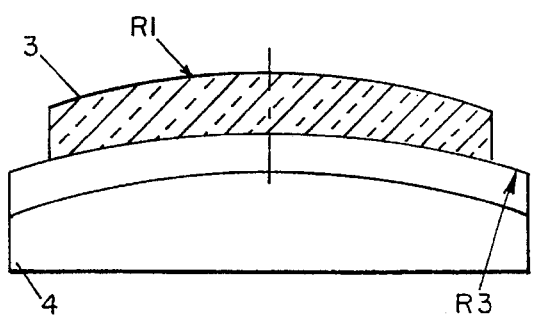
FIG. 6 is a top sectional view thereof.

Next, a major portion of the posterior surface of the blank is ground to a radius R3, and a minor portion is ground to a radius R4 which is less than R3, possibly even negative, as seen in FIG. 3. The values of R1, R2, R3 and R4 depend on factors including the optical prescription and the index of refraction of the lens material.

After the initial grinding, the lens is placed on a specially shaped block of fireproof material. The block may be cut from a block of hard ceramic material with a diamond tool. The block's top surface comprises two spherical sections of about equal size, having non-concentric but identical radii R3 (the same as the radius of the major portion of the blank's posterior surface). The geometric centers of the respective sections are arranged so that coplanar radii of each intersect. As a consequence, the left and right sections of the block surface intersect along a ridge, having a very small dihedral angle. The ridge may be smoothed by polishing. There is a resulting clearance (exaggerated in FIG. 5) between the lens and the block.

Figure 7:
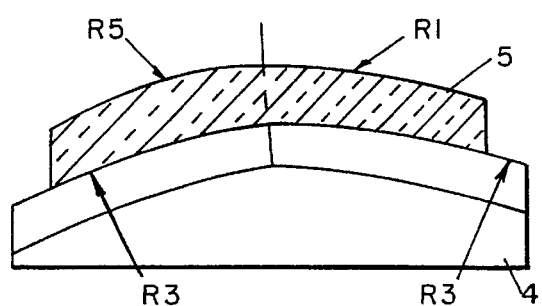
FIG. 7 is a side sectional view (like FIG. 3), of the lens after is has deformed to conform to the block.
Figure 8:
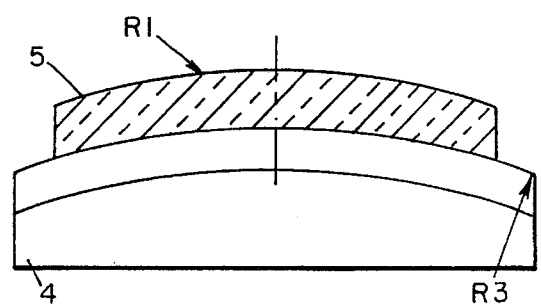
FIG. 8 is a top sectional view thereof.
Figure 10:
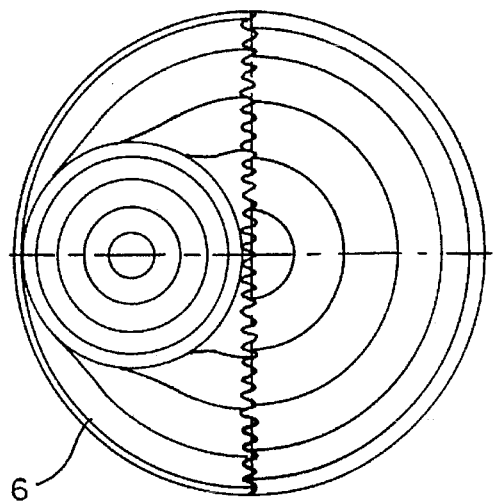
FIG. 10 is a top plan view of the complete lens.

Now, the lens is heated so that it softens sufficiently to sag under its own weight, where it is unsupported by the block. The softening temperature depends somewhat on the lens material. For most glass lenses, the temperature will be in the range of 1000° to 1400° F. The lens is allowed to sag until it conforms to the shape of the block, as can be seen in FIGS. 7 and 8. As this occurs, the anterior surface of the corresponding minor portion acquires a new radius R5, but the transition between the segments from radius R5 to R1 is not sharp.

Figure 9:
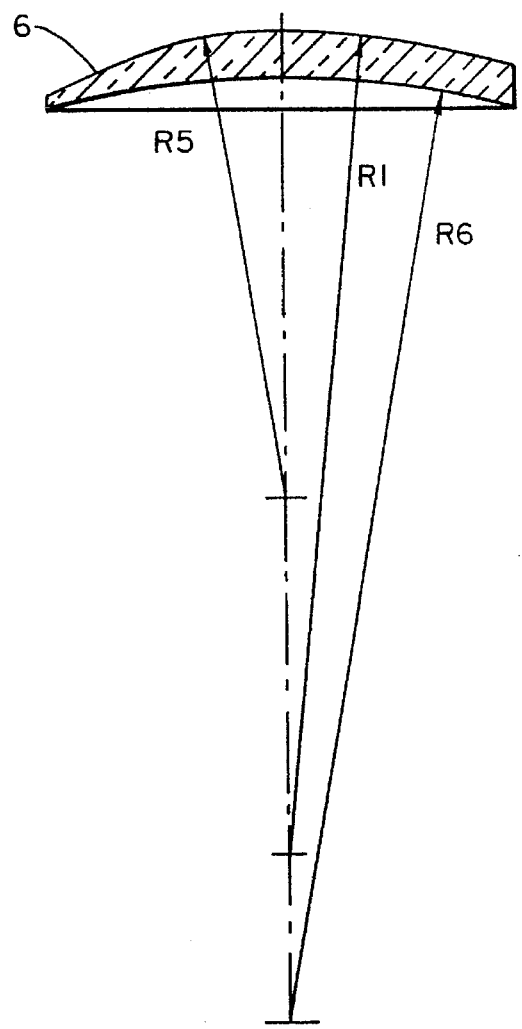
FIG. 9 is a side sectional view (like FIGS. 3, 5 and 7), showing the lens after the bottom surface has been ground.

After heat treatment, the lens is allowed to cool on the block, and finally, the posterior surface is ground to a uniform spherical radius R6, as seen in FIG. 9. The block's dihedral angle, and the final grinding center, are chosen so that the geometric centers of spherical surfaces having the respective radii R1, R5 and R6 in the final lens lie on a common line passing substantially through the center of the lens. When this line passes through the pupil of the wearer's eye, there is a smooth image transition between the segments of the lens.

The lens and method described above are presently intended for use with glass blanks. It may be, however, that the invention will have direct applicability to lenses made of other materials, and I do not intend that the invention be limited to glass lenses. It is also possible that glass lenses produced by this invention may be used as blanks from which to make metal molds for casting plastic lenses.

Since the invention is subject to modifications and variations, it is intended that the foregoing description and the accompanying drawings shall be interpreted as only illustrative of the invention defined by the following claims.

I claim:

1. A process for forming a monocentric seamless bifocal lens comprising obtaining a lens blank having a convex spherical anterior surface having a first radius and a concave spherical posterior surface having a second radius, grinding the concave posterior surface to form a major segment having a third spherical radius and a minor segment having a fourth spherical radius, providing a block having an upper surface comprising two non-concentric spherical portions intersecting along a ridge, each of said spherical portions having a radius substantially equal to that of the major segment, placing the lens, anterior surface up, on said block so that the major segment is supported by the block, but a space remains between the block and at least part of the minor segment, heating the lens while it rests on the block so that the lens deforms under its own weight to the shape of the block, whereby the anterior surface's shape is altered so that it now comprises a major segment having said first radius and a minor segment having a fifth radius, and then grinding and polishing the posterior surface to a uniform spherical sixth radius.

2. The invention of claim 1, wherein said first, fifth and sixth radii have centers lying on a common line.

* * * * *